(12) United States Patent
Flinn (10) Patent No.: US 10,556,687 B2
(45) Date of Patent: Feb. 11, 2020

(54) TAMPER EVIDENT SEAL SYSTEM

(71) Applicant: The Boeing Company, Chicago, IL (US)

(72) Inventor: Sean M. Flinn, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 108 days.

(21) Appl. No.: 15/876,744

(22) Filed: Jan. 22, 2018

(65) Prior Publication Data
US 2019/0225341 A1   Jul. 25, 2019

(51) Int. Cl.
*A47C 7/62* (2006.01)
*B64D 11/06* (2006.01)

(52) U.S. Cl.
CPC .. *B64D 11/0631* (2014.12); *B65D 2101/0007* (2013.01)

(58) Field of Classification Search
CPC .. B65D 55/026; B65D 77/2032; B65D 85/18; B65D 33/34; B65D 2101/0038; B65D 43/16; B65D 2101/0023; B65D 2101/00; G09F 3/0292; G09F 3/0341; B63C 9/11; B63C 9/22; B64D 11/0627; B64D 11/0629; B64D 11/0631; B64D 11/06; Y10S 206/807
USPC ....... 297/188.01, 188.08, 188.12; 441/80, 88
See application file for complete search history.

(56) References Cited

U.S. PATENT DOCUMENTS

| | | | |
|---|---|---|---|
| 6,960,110 B2* | 11/2005 | Hough | B63C 9/22 206/807 |
| 7,252,569 B2* | 8/2007 | Everhart | B64D 11/06 206/769 |
| 7,482,924 B1* | 1/2009 | Beinhocker | G08B 13/186 250/227.14 |
| 8,616,631 B2* | 12/2013 | Westerink | B60N 2/24 297/188.08 |
| 2003/0215162 A1* | 11/2003 | Switlik | B63C 9/22 383/59 |
| 2005/0151067 A1* | 7/2005 | Beinhocker | G08B 13/126 250/227.15 |
| 2005/0264047 A1* | 12/2005 | Bauer | A47C 7/74 297/180.13 |
| 2006/0006704 A1* | 1/2006 | Skelly | B60N 2/62 297/188.08 |
| 2007/0232164 A1* | 10/2007 | Swan | B63C 9/20 441/108 |
| 2008/0106127 A1 | 5/2008 | Hough et al. | |
| 2013/0202230 A1* | 8/2013 | Parttridge | A45C 5/00 383/200 |
| 2018/0366038 A1* | 12/2018 | Eisele | G09F 3/0292 |
| 2019/0077559 A1* | 3/2019 | Lumsden | B65D 55/026 |

* cited by examiner

*Primary Examiner* — Chi Q Nguyen
(74) *Attorney, Agent, or Firm* — Yee & Associates, P.C.

(57) ABSTRACT

A seat for an aircraft comprises a compartment and a seal system. The seal system comprises a first tab connected to a first portion of the compartment, a second tab connected to a second portion of the compartment, and a piece of adhesive material connecting the first tab to the second tab.

20 Claims, 8 Drawing Sheets

TAMPER EVIDENT SEAL SYSTEM

BACKGROUND INFORMATION

1. Field

The present disclosure relates generally to seal systems for aircraft applications. More specifically, the present disclosure relates to a tamper evident seal system used for compartments in aircraft.

2. Background

Aircraft have many storage compartments. Some of these compartments are used to store emergency equipment.

Regulations require aircraft manufacturers to inspect emergency equipment compartments before takeoff. These inspections decrease the risk that compartments have been opened, safety equipment removed, or prohibited items stored within.

Typically, aircraft manufacturers install systems in or around the compartment to aid in pre-flight inspection. For instance, manufacturers may use padlocks, zip ties, or adhesive stickers as tamper evident seals. If one of these seals is broken, the compartment is checked and the seal is replaced. Since each aircraft has hundreds of seats, thorough visual inspection of every compartment in an aircraft may take more time than desired. In addition, detecting broken or tampered seals may be more difficult than desired.

Therefore, it would be desirable to have a method and apparatus that take into account at least some of the issues discussed above, as well as other possible issues.

SUMMARY

An illustrative embodiment of the present disclosure provides a seat for an aircraft comprising a compartment and a seal system. The seal system comprises a first tab connected to a first portion of the compartment, a second tab connected to a second portion of the compartment, and a piece of adhesive material connecting the first tab to the second tab.

Another illustrative embodiment of the present disclosure provides a method for inspecting a compartment under a seat in an aircraft. A seal system is inspected. The seal system has a first tab associated with a first portion of the compartment, a second tab associated with a second portion of the compartment, and a piece of material connecting the first tab and the second tab. An inspector then determines whether at least one of the first tab or the second tab protrudes outward, indicating that the seal system is broken and the compartment has been tampered with.

A further illustrative embodiment of the present disclosure provides an aircraft comprising a passenger seat, a life vest compartment associated with the passenger seat, and a seal system. The seal system is configured to indicate whether the life vest compartment has been tampered with. The seal system comprises a first tab, a second tab, and a piece of adhesive material connecting the first tab to the second tab. The piece of adhesive material has a perforation configured to separate the piece of adhesive material when the seal system is broken.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that the process for manufacturing and installing tamper evident seals for compartments in aircraft may be more difficult and time-consuming than desired. Some currently used seal systems use adhesive material that does not bond in a desired manner with the material of the compartment. As a result, seal systems do not perform as desired. Moreover, this adhesive material may be the same color as the material of the compartment. During inspection, it may be difficult to determine whether the adhesive material has been broken, since it does match so closely with the color of the compartment.

The illustrative embodiments also recognize and take into account that other seal systems for aircraft compartments incorporate bulky materials such as padlock-style seals or zip ties. These materials not only add unnecessary weight to the aircraft but also may increase costs to manufacture, install, or replace tamper evident seals.

Thus, the illustrative embodiments provide a tamper evident seal system for compartments in aircraft. In one illustrative embodiment, the seal system comprises a first tab connected to a first portion of the compartment and a second tab connected to a second portion of the compartment. A piece of adhesive material is added to connect the first tab to the second tab. The piece of adhesive material spans an opening of the compartment. If the piece of adhesive material is broken, at least one of the first tab or the second tab protrude outward, easily indicating to inspectors that the compartment was tampered with. The adhesive material is substantially the same color as the compartment while the tabs are a contrasting color, aiding in detection of a broken seal and thus, decreasing pre-flight inspection time.

Figure 1:
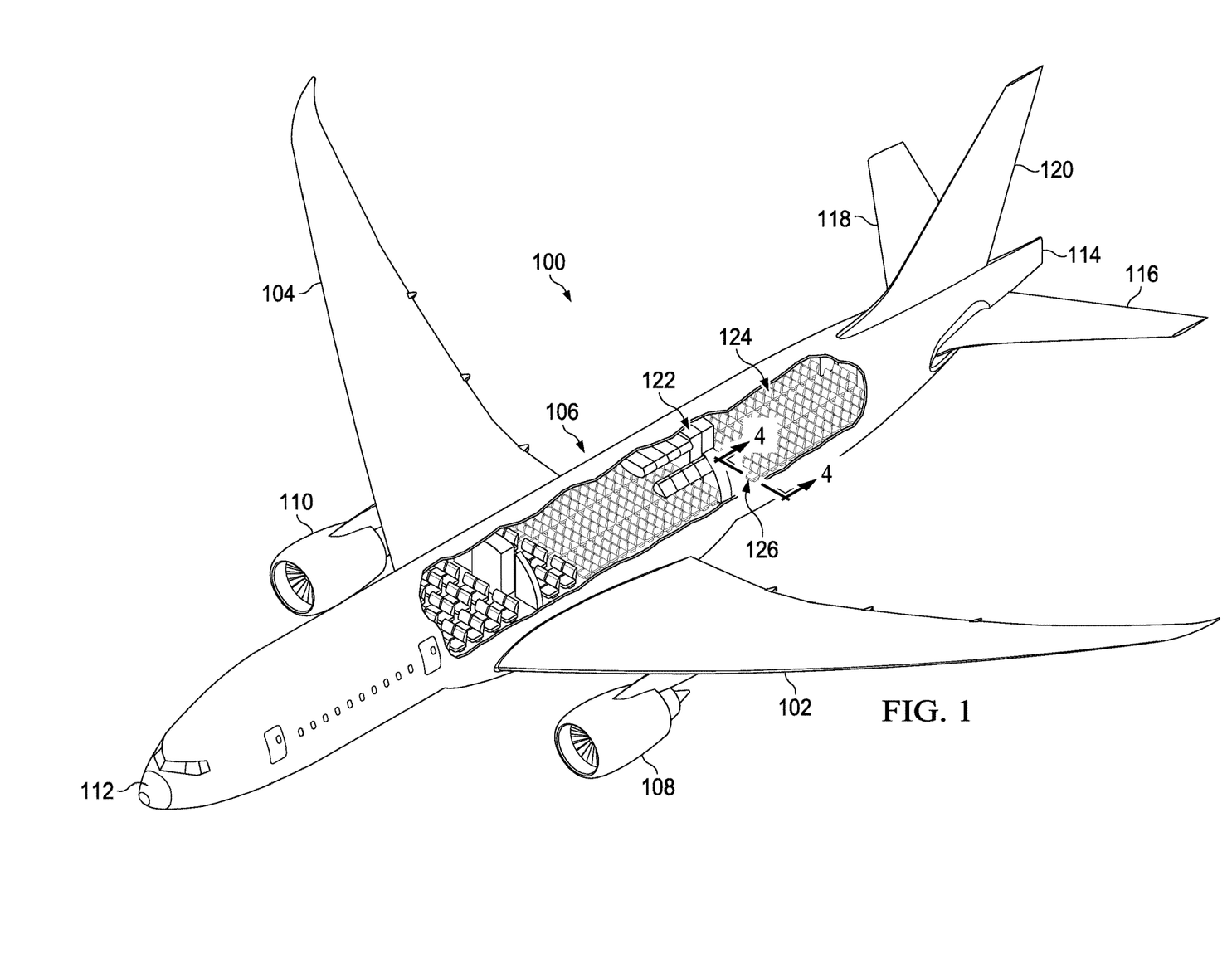
FIG. 1 is an illustration of a perspective view of an aircraft in accordance with an illustrative embodiment.

With reference now to the figures and, in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has nose section 112 and tail section 114. Horizontal stabilizer 116, horizontal stabilizer 118, and vertical stabilizer 120 are attached to tail section 114 of body 106.

In this illustrative example, passenger cabin 122 is shown in an exposed view of aircraft 100. As depicted, passenger cabin 122 includes seats 124. Seat 126 is one of seats 124 in passenger cabin 122.

Figure 2:
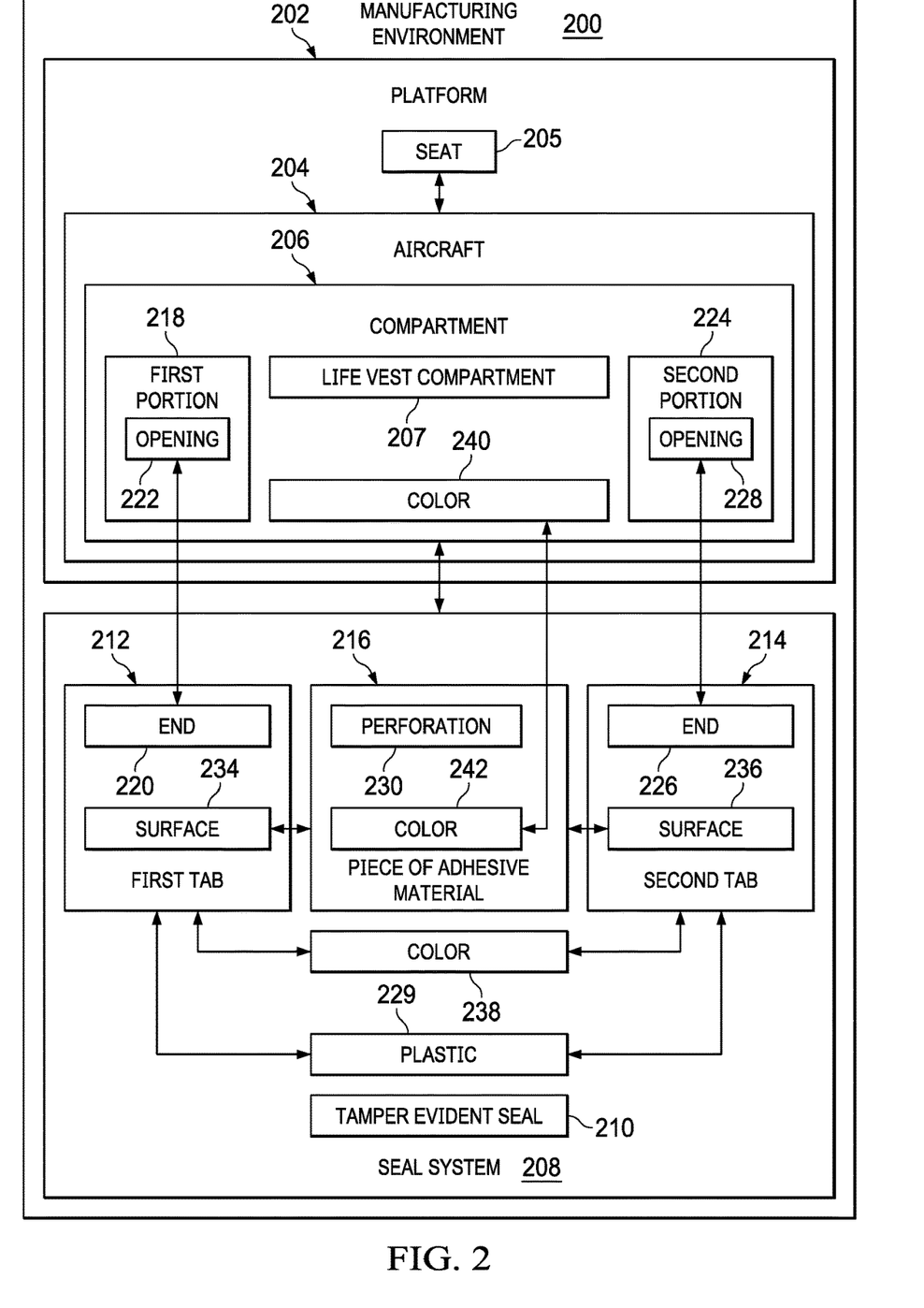
FIG. 2 is an illustration of a block diagram of a manufacturing environment in accordance with an illustrative embodiment.

Turning next to FIG. 2, an illustration of a block diagram of a manufacturing environment is depicted in accordance with an illustrative embodiment. Manufacturing environment 200 is an environment where components are manufactured for use in platform 202. Platform 202 takes the form of aircraft 204 in this illustrative example.

As depicted, aircraft 204 has seat 205 and compartment 206. Compartment 206 is associated with seat 205. Seat 205 may be located in a passenger cabin of aircraft 204, the cockpit of aircraft 204, or in some other area.

Compartment 206 is a structure configured to hold a number of items. As used herein, "a number of," when used with reference to items, means one or more items. Thus, "a number of items" includes one or more items. These items may be, for example, without limitation, emergency equipment, medical supplies, tools, electronics, food, beverages, cleaning supplies, or other suitable items. In this illustrative example, compartment 206 may be located under seat 205 and may take the form of life vest compartment 207. Life vest compartment 207 is configured to store life vests for use during a water landing.

Compartment 206 may have a door, an opening, or some other method of entry through which items move. Seal system 208 may be used to provide tamper evident seal 210 for compartment 206. For example, seal system 208 may be placed over the door such that the seal will be tamper evident if broken.

It may be desirable to inspect seal system 208 in compartment 206 at any stage of operation of aircraft 204. For instance, when compartment 206 contains emergency equipment, seal system 208 protects that equipment from being damaged, removed, or otherwise manipulated in an undesired manner without aircraft personnel being aware of such tampering. Additionally, it may be desirable to inspect seal system 208 to determine whether compartment 206 was opened and unauthorized items were placed inside.

As illustrated, seal system 208 comprises first tab 212, second tab 214, and piece of adhesive material 216. Piece of adhesive material 216 connects first tab 212 to second tab 214.

First tab 212 is connected to first portion 218 of compartment 206. In this illustrative example, first tab 212 comprises end 220 configured to engage with opening 222 in first portion 218 of compartment 206.

In a similar fashion, second tab 214 is connected to second portion 224 of compartment 206. Second tab 214 comprises end 226 configured to engage with opening 228 of second portion 224 of compartment 206. With both first tab 212 and second tab 214 connected to the respective portions of compartment 206, seal system 208 provides tamper evident seal 210 for compartment 206.

Opening 222 and opening 228 may take the form of a slit, a hole, a groove, or some other suitable opening. In an illustrative example, no adhesive, fastener, or other structure or material is used to secure first tab 212 or second tab 214 to compartment 206. The shape of end 220 of first tab 212 and end 226 of second tab 214 are designed to removably connect to compartment 206 such that no additional material is needed.

First tab 212 and second tab 214 are interchangeable in this illustrative example. In other words, first tab 212 and second tab 214 are identical parts. All features and functions of first tab 212 and second tab 214 are substantially uniform. In other illustrative examples, first tab 212 and second tab 214 may have different shapes, depending on the particular implementation. First tab 212 and second tab 214 may comprise plastic 229 or some other suitable type of material.

As depicted, piece of adhesive material 216 comprises perforation 230. Perforation 230 may be a series of holes, slits, or a thinner section of material such that piece of adhesive material 216 may be torn. Perforation 230 is configured to separate piece of adhesive material 216 when tamper evident seal 210 is broken.

In this illustrative example, piece of adhesive material 216 may take the form of a strip, a tape, a sticker, or some other suitable design. Piece of adhesive material 216 has adhesive properties on the side of the material that attaches to first tab 212 and second tab 214.

Piece of adhesive material 216 is configured to prevent first tab 212 and second tab 214 from protruding outward when seal system 208 is intact. Piece of adhesive material 216 is positioned over first tab 212 and second tab 214 such that surface 234 of first tab 212 and surface 236 of second tab 214 are not visible when seal system 208 is intact. At least one of first tab 212 or second tab 214 releases outward when piece of adhesive material 216 is broken.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

Seal system 208 is designed such that an inspector can quickly recognize whether tamper evident seal 210 is broken. First tab 212 and second tab 214 have color 238 that contrasts color 240 of compartment 206. For example, without limitation, when color 240 of compartment 206 is gray, color 238 may be white. As another example, when color 240 of compartment 206 is white, color 238 may be red.

Piece of adhesive material 216, on the other hand, has color 242. Color 242 substantially matches color 240 of compartment 206. As an example, when color 240 of compartment 206 is gray, color 242 for piece of adhesive material 216 may also be gray.

When piece of adhesive material 216 is intact, an inspector sees color 242 (color 240) and knows that compartment 206 has not been tampered with. When piece of adhesive material 216 is broken, first tab 212 and second tab 214 pop out, revealing color 238 that contrasts with color 240 of compartment 206 and indicates tampering. Thus, the illustrative examples provide a way to more easily identify broken seals during inspection of compartment 206.

In some illustrative examples, seal system 208 may be installed in compartment 206 prior to compartment 206 being installed in aircraft 204. In other illustrative examples, seal system 208 is installed after compartment 206 is positioned within aircraft 204. Seal system 208 also may be replaced at any time without removing components within compartment 206.

Figures 3, 4:
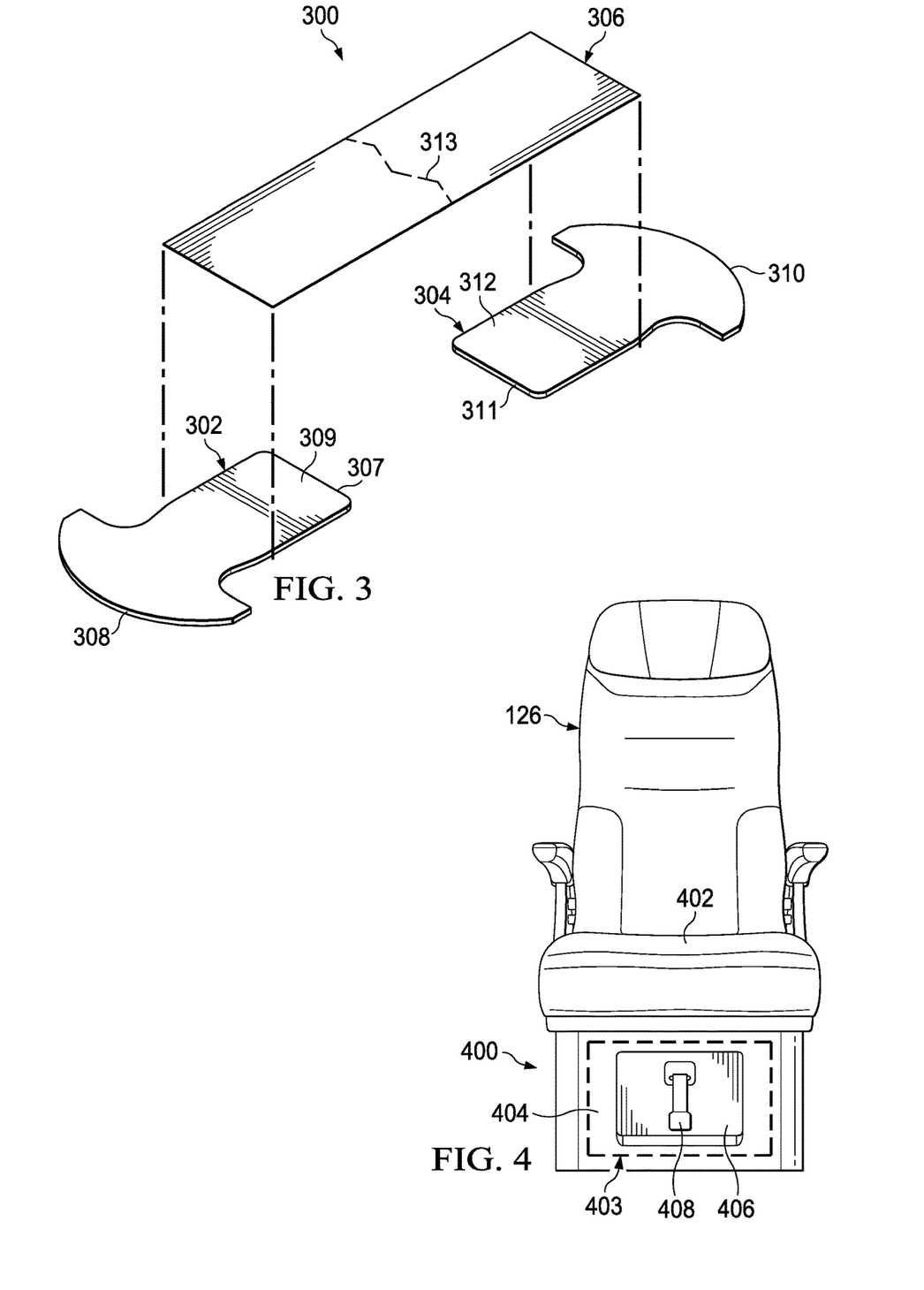
FIG. 3 is an illustration of an exploded view of a seal system in accordance with an illustrative embodiment.
FIG. 4 is an illustration of a front view of a seat with a life vest compartment in accordance with an illustrative embodiment.

With reference next to FIG. 3, an illustration of an exploded view of a seal system is depicted in accordance with an illustrative embodiment. Seal system 300 is an example of one implementation for seal system 208 shown in block form in FIG. 2.

As illustrated, seal system 300 includes tab 302, tab 304, and adhesive material 306. Tab 302 has end 307, end 308, and surface 309. End 308 has a shape configured to engage with an opening in one portion of a compartment.

Tab 304 has end 310, end 311, and surface 312. End 310 has a shape configured to engage with an opening in a different portion of the compartment.

Adhesive material 306 bridges the gap between tab 302 and tab 304. Adhesive material 306 takes the form of sticker in this illustrative example. Adhesive material 306 has perforation 313.

Turning next to FIG. 4, an illustration of a front view of a seat with a life vest compartment is depicted in accordance with an illustrative embodiment. FIG. 4 depicts a front view of seat 126 in passenger cabin 122 in the direction of view lines 4-4 in FIG. 1.

As depicted, seat 126 has life vest compartment 400 located underneath cushion 402. Life vest compartment 400 is an example of one implementation for compartment 206 shown in block form in FIG. 2.

Life vest compartment 400 is shown in section 403 in this view. Life vest compartment 400 is configured to stow a life vest (not shown). Life vest compartment 400 includes housing 404, door 406, and strap 408. Door 406 may be opened using strap 408.

Figure 5:
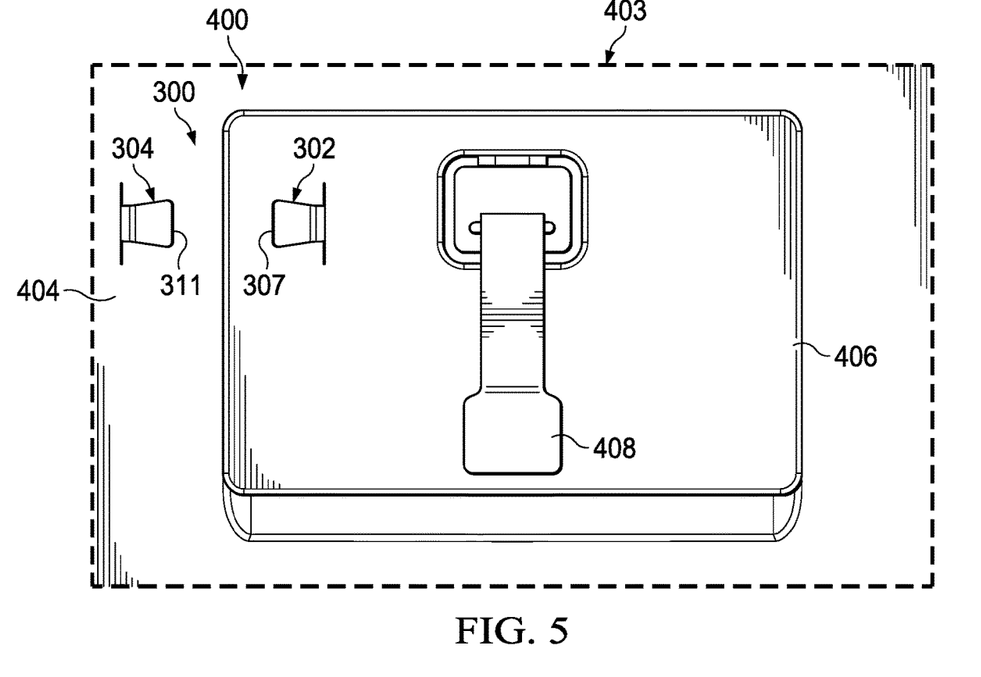
FIG. 5 is an illustration of a front view of a life vest compartment with a seal system in accordance with an illustrative embodiment.

Turning now to FIG. 5, an illustration of a front view of a life vest compartment with a seal system is depicted in accordance with an illustrative embodiment. FIG. 5 depicts a more-detailed view of section 403 in FIG. 4.

As illustrated, a portion of seal system 300 is installed on life vest compartment 400 in seat 126 on aircraft 100. In this illustrative example, tab 302 is connected to door 406 of life vest compartment 400 while tab 304 is connected to housing 404 of life vest compartment 400.

As shown, adhesive material 306 has not been added to hold down tab 302 and tab 304. Without adhesive material 306, end 307 of tab 302 protrudes outward. In a similar fashion, end 311 of tab 304 protrudes outward.

The color of tab 302 and tab 304 is selected to contrast the color of life vest compartment 400. In this illustrative example, housing 404 and door 406 are one color (e.g., gray). Tab 302 and tab 304 are a contrasting color (e.g., white). Of course, various color combinations are possible. The color contrast is configured to be visually noticeable.

Figure 6:
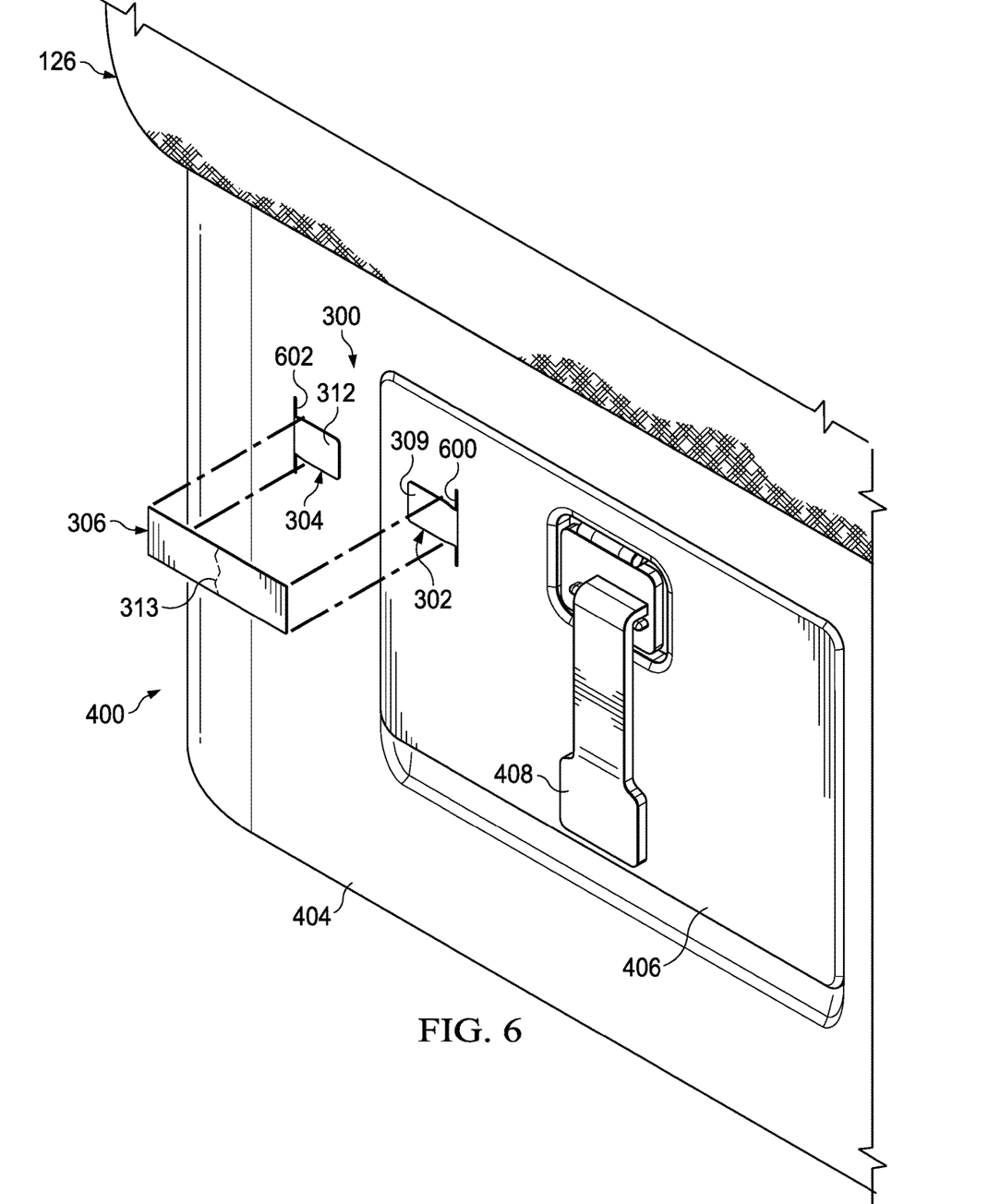
FIG. 6 is an illustration of a perspective view of a life vest compartment with a seal system in accordance with an illustrative embodiment.

In FIG. 6, an illustration of a perspective view of a life vest compartment with a seal system is depicted in accordance with an illustrative embodiment. An even more-detailed view of life vest compartment 400 with seal system 300 is shown in FIG. 5.

As depicted, end 308 of tab 302 is engaged with slit 600 in door 406 of life vest compartment 400. End 310 of tab 304 is engaged with slit 602 in housing 404 of life vest compartment 400 in a similar manner. The size and shape of adhesive material 306 is selected to cover substantially all of the exposed area of surface 309 of tab 302 and substantially all of the exposed area of surface 312 of tab 304 in this illustrative example.

Adhesive material 306 holds down tab 302 and tab 304 to form a tamper evident seal. Adhesive material 306 has a color that is substantially similar to both housing 404 and door 406 in this illustrative example.

Figure 7:
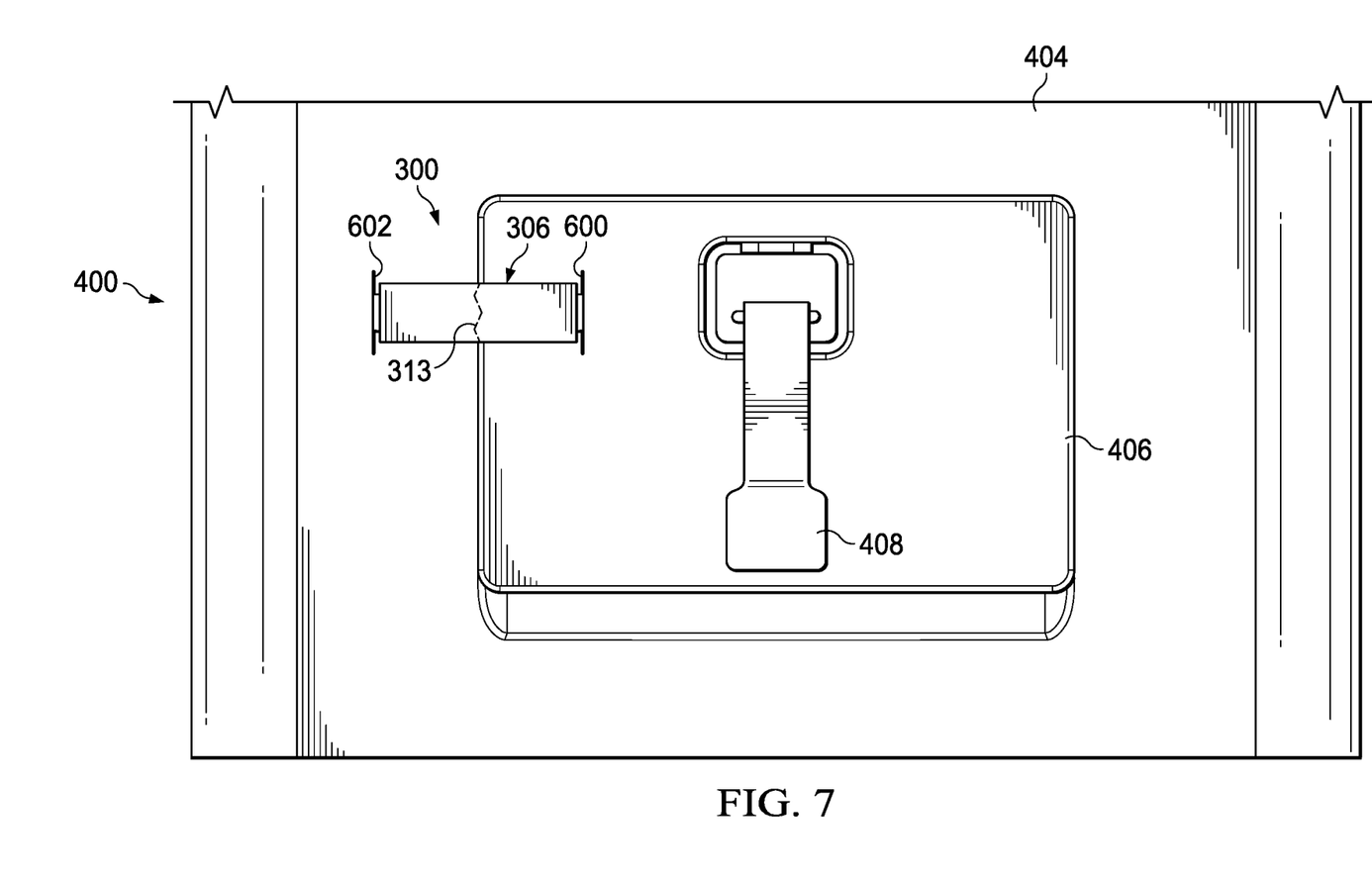
FIG. 7 is an illustration of a front view of a life vest compartment with a seal system installed in accordance with an illustrative embodiment.

With reference next to FIG. 7, an illustration of a front view of a life vest compartment with a seal system installed is depicted in accordance with an illustrative embodiment. Seal system 300 has been completely installed in life vest compartment 400.

As shown in this view, adhesive material 306 covers the entirety of the exposed surfaces of tab 302 and tab 304. In other illustrative examples, adhesive material 306 may not cover all of the exposed surfaces of tab 302, tab 304, or both.

When installed, the color of adhesive material 306 blends in with the color of life vest compartment 400 when adhesive material 306 remains unbroken. Movement of door 406, which could indicate tampering, may break adhesive material 306 along perforation 313. As a result, adhesive material 306 will no longer hold down tab 302 and tab 304.

Aircraft 100 in FIG. 1 is only one physical implementation of platform 202 incorporating compartment 206 with seal system 208 from FIG. 2. Although the examples for an illustrative embodiment are described with respect to an aircraft, an illustrative embodiment may be applied to other types of platforms. Seal system 208 may be used in any platform where tamper evident seals are desired. The platform may be, for example, a mobile platform, a stationary platform, a land-based structure, an aquatic-based structure, or a space-based structure. More specifically, the platform may be a surface ship, a tank, a personnel carrier, a train, a spacecraft, a space station, a satellite, a submarine, an automobile, a power plant, a bridge, a dam, a house, a manufacturing facility, a building, and other suitable platforms.

The different components shown in FIG. 1 and FIGS. 3-7 may be combined with components in FIG. 2, used with components in FIG. 2, or a combination of the two. Additionally, some of the components in FIG. 1 and FIGS. 3-7 may be illustrative examples of how components shown in block form in FIG. 2 may be implemented as physical structures.

Figure 8:
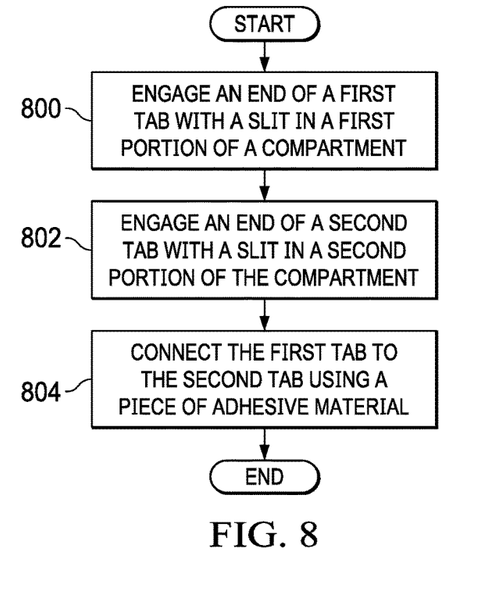
FIG. 8 is an illustration of a flowchart of a process for installing a seal system for a compartment under a seat in an aircraft in accordance with an illustrative embodiment.

In FIG. 8, an illustration of a flowchart of a process for installing a seal system for a compartment under a seat in an aircraft is depicted in accordance with an illustrative embodiment. The method depicted in FIG. 8 may be used to install seal system 208 to provide tamper evident seal 210 for compartment 206 in FIG. 2.

The process begins by engaging an end of a first tab with a slit in a first portion of a compartment (operation 800). The opposite end of the first tab remains floating and exposed.

Next, the process engages an end of a second tab with a slit in a second portion of the compartment (operation 802). Similarly, the opposite end of the second tab remains floating and exposed. The process then connects the first tab to the second tab using a piece of adhesive material (operation 804), with the process terminating thereafter.

Figure 9:
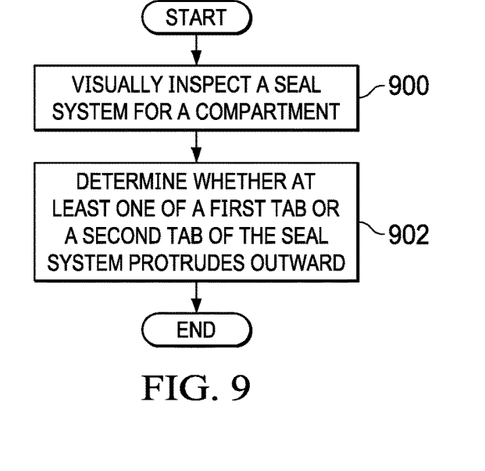
FIG. 9 is an illustration of a flowchart of a process for inspecting a compartment under a seat in an aircraft in accordance with an illustrative embodiment.

Turning now to FIG. 9, an illustration of a flowchart of a process for inspecting a compartment under a seat in an aircraft is depicted in accordance with an illustrative embodiment. The method depicted in FIG. 9 may be used to inspect compartment 206 in FIG. 2.

The process begins by visually inspecting a seal system for a compartment (operation 900). The seal system comprises the components described with reference to seal system 208 for compartment 206 in FIG. 2.

Next, the process determines whether at least one of a first tab or a second tab of the seal system protrudes outward (operation 902), with the process terminating thereafter. Operation 902 may include determining whether a color of at least one of the first tab or the second tab visibly contrasts with a color of the compartment. If so, then the tabs protrude outward. If not, the seal may still be intact. In some instances, the results may be recorded for later replacement or rework.

Figure 10:
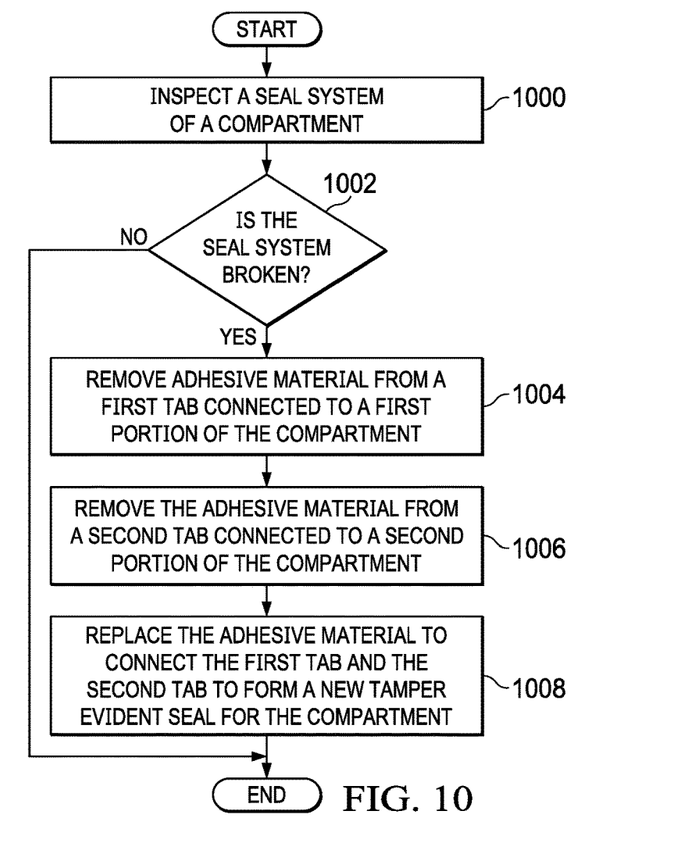
FIG. 10 is an illustration of a flowchart of a process for replacing a seal system for a compartment in an aircraft in accordance with an illustrative embodiment.

With reference next to FIG. 10, an illustration of a flowchart of a process for replacing a seal system for a compartment in an aircraft is depicted in accordance with an illustrative embodiment. The method depicted in FIG. 10 may be used to replace seal system 208 that is damaged to provide a new one of tamper evident seal 210 for compartment 206 in FIG. 2.

The process begins by inspecting a seal system of a compartment (operation 1000). The process then determines if the seal system is broken (operation 1002). If the seal system is not broken, the process terminates.

If the seal system is broken, adhesive material is removed from a first tab connected to a first portion of the compartment (operation 1004). Thereafter, the adhesive material is removed from a second tab connected to a second portion of the compartment (operation 1006). This adhesive material may be segments of a sticker or tape that were broken due to tampering in the compartment.

Next, the adhesive material is replaced to connect the first tab and the second tab to form a new tamper evident seal for the compartment (operation 1008), with the process terminating thereafter. The process described with reference to FIGS. 9-10 can be repeated for each compartment in need of inspection and each seal in need of replacement.

The flowcharts and block diagrams in the different depicted illustrative embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

Figure 11:
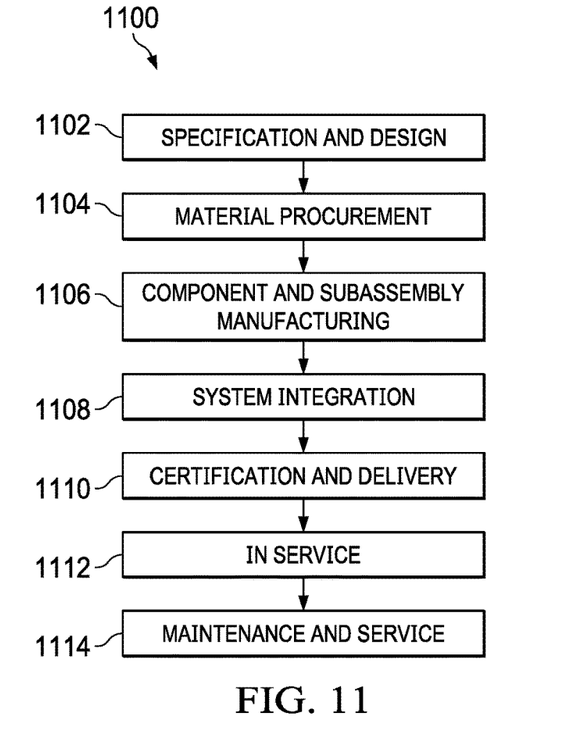
FIG. 11 is an illustration of a block diagram of an aircraft manufacturing and service method in accordance with an illustrative embodiment.
Figure 12:
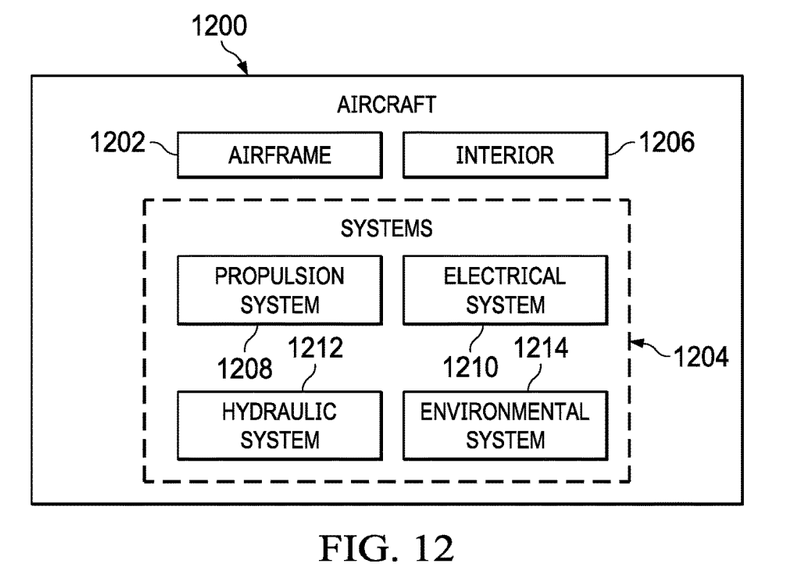
FIG. 12 is an illustration of a block diagram of an aircraft in which an illustrative embodiment may be implemented.

Illustrative embodiments of the disclosure may be described in the context of aircraft manufacturing and service method 1100 as shown in FIG. 11 and aircraft 1200 as shown in FIG. 12. Turning first to FIG. 11, an illustration of an aircraft manufacturing and service method is depicted in accordance with an illustrative embodiment. During pre-production, aircraft manufacturing and service method 1100 may include specification and design 1102 of aircraft 1200 in FIG. 12 and material procurement 1104.

During production, component and subassembly manufacturing 1106 and system integration 1108 of aircraft 1200 in FIG. 12 takes place. Thereafter, aircraft 1200 in FIG. 12 may go through certification and delivery 1110 in order to be placed in service 1112. While in service 1112 by a customer, aircraft 1200 in FIG. 12 is scheduled for routine maintenance and service 1114, which may include modification, reconfiguration, refurbishment, and other maintenance or service.

Seal system 208 from FIG. 2 and the components within seal system 208 may be made during component and subassembly manufacturing 1106. In addition, seal system 208 may be made for routine maintenance and service 1114 as part of a modification, reconfiguration, or refurbishment of compartments within aircraft 1200.

Each of the processes of aircraft manufacturing and service method 1100 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of a block diagram of an aircraft is depicted in which an illustrative embodiment may be implemented. In this example, aircraft 1200 is produced by aircraft manufacturing and service method 1100 in FIG. 11 and may include airframe 1202 with plurality of systems 1204 and interior 1206. Examples of systems 1204 include one or more of propulsion system 1208, electrical system 1210, hydraulic system 1212, and environmental system 1214.

Any number of other systems may be included. Although an aerospace example is shown, different illustrative embodiments may be applied to other industries, such as the automotive industry. Apparatuses and methods embodied herein may be employed during at least one of the stages of aircraft manufacturing and service method 1100 in FIG. 11.

In one illustrative example, components or subassemblies produced in component and subassembly manufacturing 1106 in FIG. 11 may be fabricated or manufactured in a manner similar to components or subassemblies produced while aircraft 1200 is in service 1112 in FIG. 11. As yet another example, one or more apparatus embodiments, method embodiments, or a combination thereof may be utilized during production stages, such as component and subassembly manufacturing 1106 and system integration 1108 in FIG. 11. One or more apparatus embodiments, method embodiments, or a combination thereof may be utilized while aircraft 1200 is in service 1112, during maintenance and service 1114 in FIG. 11, or both. The use of a number of the different illustrative embodiments may substantially expedite the assembly of aircraft 1200, reduce the cost of aircraft 1200, or both expedite the assembly of aircraft 1200 and reduce the cost of aircraft 1200.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

The illustrative embodiments describe a tamper evident seal system used for compartments within an aircraft. The simple design provides ease of manufacturing and decreases cost of seal systems used for this purpose. The tabs are interchangeable, giving them the ability to be mass produced at a lower cost than some currently used systems.

Components within a seal system are easily installed without the use of adhesive or fasteners to connect the tabs to the compartment. Seal systems in accordance with an illustrative embodiment may be added to a new aircraft as it is manufactured or retrofitted on compartments already in place in an existing aircraft.

With an illustrative embodiment, pre-flight inspection time is reduced as the color contrast of a broken seal system is more quickly evident than with some currently used systems. Tamper evident seals can be replaced by simply adding a new strip of adhesive material.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a compartment disposed under a seat of an aircraft; and
a seal system comprising:
a first tab connected to a first portion of the compartment;
a second tab connected to a second portion of the compartment; and
a piece of adhesive material connecting the first tab and the second tab, wherein:
a first portion of the piece of adhesive material is interposed between the first tab and a perforation in the piece of adhesive material; and
a second portion of the piece of adhesive material is interposed between the second tab and the perforation.

2. The apparatus of claim 1, wherein the seal system provides a tamper evident seal for the compartment.

3. The apparatus of claim 2, wherein the perforation is configured to separate the piece of adhesive material when the tamper evident seal is broken.

4. The apparatus of claim 2, wherein the first tab comprises a first end configured to engage with an opening in the first portion of the compartment and the second tab comprises a second end configured to engage with an opening in the second portion of the compartment.

5. The apparatus of claim 2, wherein the first tab and the second tab have a first color that contrasts a second color of the compartment.

6. The apparatus of claim 5, wherein the piece of adhesive material has a third color that substantially matches the second color.

7. The apparatus of claim 1, wherein the piece of adhesive material is configured to prevent the first tab and the second tab from protruding outward when the seal system is intact.

8. The apparatus of claim 7, wherein at least one of the first tab or the second tab releases outward when the piece of adhesive material is broken.

9. The apparatus of claim 1, wherein the piece of adhesive material is positioned over the first tab and the second tab such that a first surface of the first tab and a second surface of the second tab are not visible when the seal system is intact.

10. The apparatus of claim 1, wherein the first tab and the second tab are interchangeable.

11. The apparatus of claim 1, wherein the seal system is installed on a life vest compartment on an aircraft.

12. The apparatus of claim 1, wherein the seat is located in a passenger cabin in the aircraft.

13. A method comprising:
inspecting a compartment under a seat in an aircraft by:
inspecting a seal system having a first tab associated with a first portion of the compartment, a second tab associated with a second portion of the compartment, and a piece of adhesive material connecting the first tab and the second tab, wherein:
a first portion of the piece of adhesive material is interposed between the first tab and a perforation in the piece of adhesive material; and
a second portion of the piece of adhesive material is interposed between the second tab and the perforation; and
determining whether at least one of the first tab or the second tab protrudes outward.

14. The method of claim 13, wherein the determining comprises:
determining whether a first color of at least one of the first tab or the second tab visibly contrasts a second color of the compartment.

15. An aircraft comprising:
a seat;
a life vest compartment associated with the seat; and
a seal system configured to indicate whether the life vest compartment has been tampered with, wherein the seal system comprises:
a first tab;
a second tab; and
a piece of adhesive material connecting the first tab to the second tab, wherein:
the first tab has a first portion disposed in the life vest compartment;
the first tab has a second portion protruding outward from the life vest compartment;
the second tab has a third portion disposed in the life vest compartment;
the second tab has a fourth portion protruding outward from the life vest compartment; and
the piece of adhesive material has a perforation configured to separate the piece of adhesive material when the seal system is broken.

16. The aircraft of claim 15, wherein the first tab is connected to a first portion of the life vest compartment and the second tab is connected to a second portion of the life vest compartment to provide a tamper evident seal for the life vest compartment.

17. The aircraft of claim 16, wherein the first tab and the second tab have a first color that contrasts a second color of the life vest compartment.

18. The aircraft of claim 17, wherein the piece of adhesive material has a third color that matches the second color.

19. The aircraft of claim 18, wherein at least one of the first tab or the second tab releases outward when the piece of adhesive material is broken.

20. The aircraft of claim 15, wherein the piece of adhesive material is positioned over the first tab and the second tab such that a first surface of the first tab and a second surface of the second tab are not visible when the seal system is intact.

* * * * *